(12) United States Patent
Nakai

(10) Patent No.: US 6,757,104 B2
(45) Date of Patent: Jun. 29, 2004

(54) PICTURE TAKING APPARATUS HAVING DIFFRACTIVE OPTICAL ELEMENT

(75) Inventor: Takehiko Nakai, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/838,422

(22) Filed: Apr. 19, 2001

(65) Prior Publication Data

US 2002/0034011 A1 Mar. 21, 2002

(30) Foreign Application Priority Data

Apr. 20, 2000 (JP) ........................................ 2000-119744
Apr. 17, 2001 (JP) ........................................ 2001-117979

(51) Int. Cl.[7] ................................................ G02B 5/18
(52) U.S. Cl. ........................................ 359/569; 359/576
(58) Field of Search ................................. 359/576, 569

(56) References Cited

U.S. PATENT DOCUMENTS

| | | | |
|---|---|---|---|
| 5,044,706 A | 9/1991 | Chen | 359/357 |
| 6,011,651 A | 1/2000 | Kamo | 359/575 |
| 6,157,488 A | 12/2000 | Ishii | 359/569 |
| 6,507,437 B1 | 1/2003 | Nakai | 359/576 |

FOREIGN PATENT DOCUMENTS

| | | |
|---|---|---|
| EP | 898 182 A2 | 2/1999 |
| EP | 898 182 A3 | 4/1999 |
| EP | 965 864 | 12/1999 |
| EP | 1014150 | 6/2000 |
| JP | 4-213421 | 8/1992 |
| JP | 6-32462 | 11/1994 |
| JP | 9-127322 | 5/1997 |
| JP | 10-104411 | 4/1998 |
| JP | 10-133149 | 5/1998 |
| JP | 2000-241614 | 9/2000 |

OTHER PUBLICATIONS

Technical Guide, Color Models–The Munsell Color System, Adobe customer support [retrieved on May 12, 2003]. Retrieved from the Internet: <URL: http://www.adobe.com/support techguides/color/colormodels/munsell.html>.*
"Using hybrid refractive–diffractive elements in infrared Petzval objectives", A. P. Wood, International Lens Design Conferences, Jun. 11–14, 1990 Monterey, CA Proceedings—SPIE— The International Society of Optical Engineering. vol. 1354.
European Search Report, Jul. 2001.

* cited by examiner

*Primary Examiner*—Mark A. Robinson
*Assistant Examiner*—Alessandro Amari
(74) *Attorney, Agent, or Firm*—Morgan & Finnegan, L.L.P.

(57) ABSTRACT

In order to obtain a diffractive optical element with which a high diffraction efficiency can be obtained in a wide wavelength range and color flare is not noticeable and a picture taking apparatus using this diffractive optical element, an image is formed on a picture taking unit by using a diffractive optical element in an optical system. The diffractive optical element has a grating structure obtained by stacking a plurality of diffraction gratings made of at least two types of materials with different dispersion properties to enhance diffraction efficiency for a particular design order throughout a predetermined wavelength region and a plurality of design wavelengths which exist in a predetermined design order and at which a maximum optical path length difference in the grating structure becomes an integer multiple of a wavelength, the diffractive optical element having a design wavelength $\lambda 0$ satisfying predetermined conditions.

11 Claims, 9 Drawing Sheets

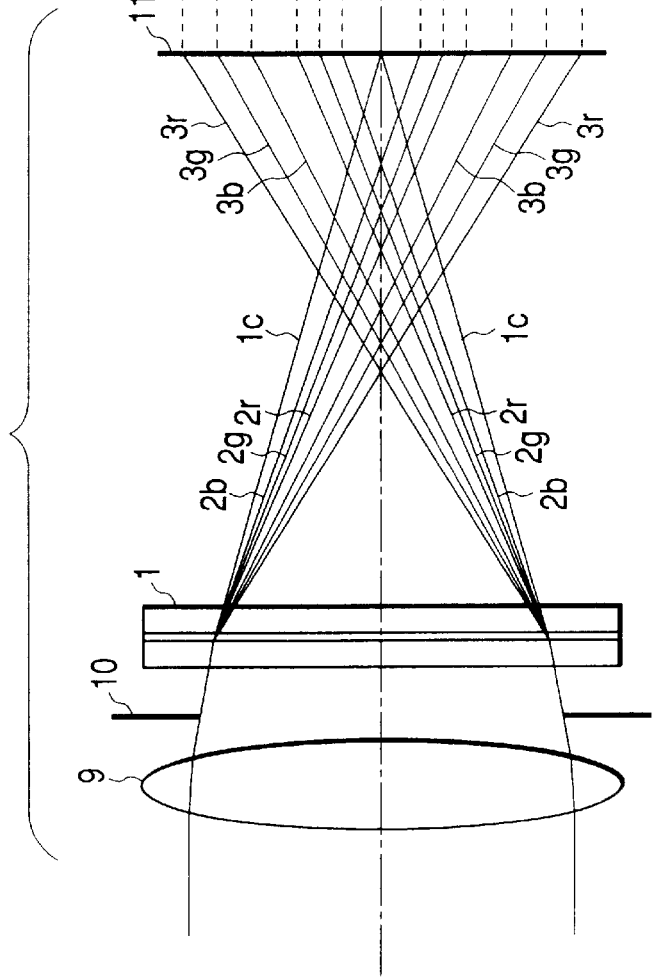
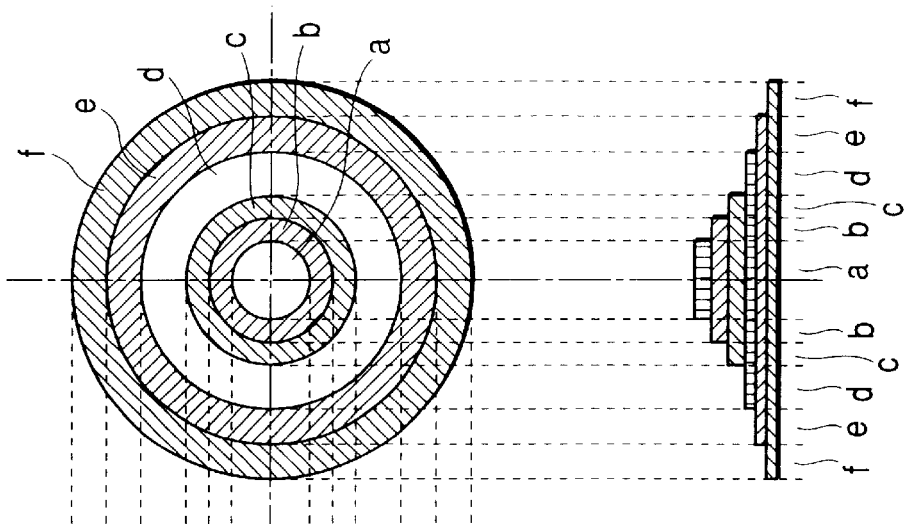
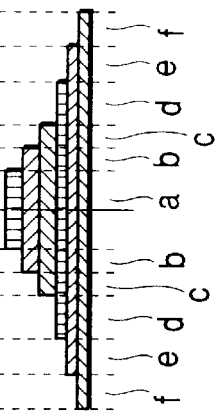
FIG. 6A
FIG. 6B
FIG. 6C

FIG. 10

| | FIRST EMBODIMENT | | | | | | COMPARATIVE EXAMPLE | | | | | |
|---|---|---|---|---|---|---|---|---|---|---|---|---|
| | a | b | c | d | e | f | a | b | c | d | e | f |
| U1, n(λ)−U1, r(λ) | 255 | 178 | 178 | 178 | 44 | 44 | 255 | 46 | 46 | 46 | 9 | 9 |
| U2, n(λ)−U2, r(λ) | 255 | 255 | 46 | 46 | 46 | 12 | 255 | 255 | 19 | 19 | 19 | 4 |
| U3, n(λ)−U3, r(λ) | 200 | 200 | 200 | 26 | 26 | 26 | 200 | 200 | 200 | 22 | 22 | 22 |
| CONDITIONAL EXPRESSION (10) | ○ | | | | | ○ | ○ | × | × | | × | × |
| CONDITIONAL EXPRESSION (11) | | ○ | | ○ | | | ○ | | | ○ | | |
| CONDITIONAL EXPRESSION (12) | | | ○ | | ○ | | | × | | | × | |
| CONDITIONAL EXPRESSION (13) | ○ | ○ | ○ | ○ | ○ | ○ | ○ | | ○ | ○ | | ○ |

PICTURE TAKING APPARATUS HAVING DIFFRACTIVE OPTICAL ELEMENT

BACKGROUND OF THE INVENTION

1. Field of the Invention

The present invention relates to a diffractive optical element used for a plurality of wavelengths or light in a predetermined wavelength band and a picture taking apparatus using the same and, more specifically, a diffractive optical element used for part of a picture taking optical system for forming a color image by using color light bands of three or more colors.

2. Related Background Art

As a method of correcting the chromatic aberration of an optical system, a method of combining two glass materials (lenses) having different dispersions is available.

In contrast to this method of reducing chromatic aberration by combining these two glass materials, a method of reducing chromatic aberration by providing a diffractive optical element (to be also referred to as a diffraction grating hereinafter) having a diffraction effect for a lens surface or a portion other than the lens surface of an optical system is disclosed in, for example, SPIE Vol. 1354 International Lens Design Conference (1990), Japanese Patent Application Laid-Open Nos. 4-213421 and 6-324262 and U.S. Pat. No. 5,044,706. This method uses the physical phenomenon that when the refractive powers of a refraction plane and diffraction plane in an optical system are equal in sign, chromatic aberrations occur in opposite directions with respect to a ray having a given reference wavelength. Such a diffractive optical element can be made to have an aspherical lens effect by arbitrarily changing the period of the periodic structure of the element, and hence exhibits a great effect in reducing monochromatic aberration.

When a given ray is refracted, the ray remains a single ray after refraction, whereas when a given ray is diffracted, the ray is split into diffracted light components of a plurality of orders. When, therefore, a diffractive optical element is to be used for an optical system, a grating structure must be determined to make light beams in an operating wavelength range concentrate on a specific order (to be also referred to as a "design order" hereinafter). When light concentrates on a specific order, the intensity of diffracted light components of other orders is low. When the intensity of a diffracted light component is 0, the light component does not exist.

To exploit the characteristics of the above diffractive optical element, the diffraction efficiency of a ray of the design order must be sufficiently high in the entire operation wavelength range. A ray of a diffraction order other than the design order is formed into an image at a position different from that of a ray of the design order, and hence becomes flare (light). In an optical system using a diffractive optical element, therefore, careful consideration must be given to the spectral distribution of the diffraction efficiencies of rays of the design order of the diffractive optical element and the behaviors of rays of orders other than the design order (unnecessary diffracted light components).

FIG. 14 shows the diffraction efficiency characteristics of rays of specific diffraction orders in a case where a diffractive optical element 1 having a single-layer diffraction grating 6 formed on a substrate 4 as shown in FIG. 13 is formed on a given surface in an optical system. In the following description, a diffraction efficiency value is the ratio of the light intensity of each diffracted light component to that of the entire transmitted light beam without any consideration to reflected light at a grating interface surface because of an increase in complexity in description. Referring to FIG. 14, the abscissa represents the wavelength; and the ordinate, the diffraction efficiency. This diffractive optical element is designed such that the diffraction efficiency of the first diffraction order (the solid line in FIG. 14) is maximized in the operating wavelength range. That is, the design order is the first order. FIG. 14 also shows the diffraction efficiencies of diffraction orders (first order ±first order, i.e., the zero order and second order) close to the design order.

As shown in FIG. 14, the diffraction efficiency of the design order is maximized at a given wavelength (to be referred to as a "design wavelength" hereinafter) and gradually decreases at other wavelengths. A decrease in the diffraction efficiency of this design order corresponds to diffracted light of another order and becomes flare. When a plurality of diffractive optical elements are used, in particular, a decrease in diffraction efficiency at a wavelength other than the design wavelength leads to a decrease in transmittance.

Various conventional arrangements for reducing the influence of flare have been proposed.

For example, the diffractive optical element disclosed in Japanese Patent Application Laid-Open No. 9-127322 is obtained by optimally selecting three different materials (three diffraction gratings 6, 7, and 12) and two different grating thicknesses d1 and d2 and arranging the respective diffraction gratings close to each other with an equal pitch distribution, as shown in FIG. 15. With this arrangement, as shown in FIG. 16, high diffraction efficiency at the design order is realized throughout the entire visible region.

The present inventor has also proposed an arrangement capable of suppressing a decrease in diffraction efficiency in Japanese Patent Application Laid-Open No. 10-133149. The diffractive optical element proposed in this reference has a cross-sectional shape of a multilayer formed by stacking two layers, and high diffraction efficiency of a design order is realized throughout the entire visible region by optimizing the refractive indices, dispersion characteristics, and grating thicknesses of materials for two layers 6 and 7, as shown in FIG. 17.

Japanese Patent Application Laid-Open No. 10-104411 discloses a diffractive optical element configured to decrease the intensity of unnecessary diffracted light components of orders near the design order by properly shifting the design wavelength by adjusting the grating thickness of a kinoform type diffractive optical element like the one shown in FIG. 13.

The present applicant has also proposed an optical system in Japanese Patent Application No. 11-344369 (Japanese Patent Application Laid-Open No. 2000-241614), which is configured to properly reduce unnecessary diffracted light components of orders near the design order by using a diffractive optical element having a multilayered structure.

Of the conventional elements, the diffractive optical element proposed in Japanese Patent Application Laid-Open No. 9-127322 is configured to greatly improve the diffraction efficiency of the design order, and hence the intensity of unnecessary diffracted light components as diffracted light components of orders other than the design order is reduced, thus decreasing flare. However, color flare is noticeable in an obtained image. Furthermore, no detailed description is made about the color appearance of flare, the intensity of flare, and the like.

In Japanese Patent Application Laid-Open No. 10-104411, the influences of color flare of unnecessary-order light on a grating shape having one diffraction plane as shown in FIG. 13 is described (to be referred to as a "single-layer DOE" hereinafter). However, no description is made about flare in a diffractive optical element having a cross-sectional shape of a multilayer obtained by stacking two or more layers (to be referred to as a "multilayered DOE" hereinafter).

In an optical system using the above multilayered DOE, flare is greatly reduced as compared with a single-layer DOE. However, unnecessary diffracted light is not completely eliminated but is slightly left.

In applications to optical systems in which picture taking (projection) conditions remain unchanged (e.g., the reader lens of a copying machine and the projection lens of a liquid crystal projector), the influences of flare are suppressed by multilayered DOEs to a level at which no problem arises. However, according to various studies made by the present inventor, it was found that in optical systems designed to take pictures of objects in various conditions, e.g., a camera and video camera, slight residual flare might pose a problem.

For example, if a high-luminance light source exists in an object field, picture taking operation is performed at proper exposure with respect to an object other than the light source instead of setting proper exposure with respect to the light source. Assume that the light source is exposed to light 1,000 times higher in intensity than that for proper exposure. In this case, even if residual flare is as small as 0.2%, since the intensity of flare from the light source portion is multiplied by 1,000, the resultant flare has an intensity twice as higher than that of proper exposure, resulting in noticeable flare in a taken image.

As described above, when a multilayered DOE is applied to a camera or video apparatus, even slight flare may raise a problem. If a flare component has wavelength dependence, in particular, color flare similar to color light characteristics based on the single-layer DOE disclosed in Japanese Patent Application Laid-Open No. 10-104411 is produced even in an arrangement using a multilayered DOE.

It is an object of the present invention to provide an diffractive optical element in which color flare caused by unnecessary-order diffracted light is made unnoticeable, and a picture taking apparatus having the diffractive optical element.

SUMMARY OF THE INVENTION

In order to achieve the above object, in one aspect of the present invention, there is provided a picture taking apparatus having a diffractive optical element, which forms an image on picture taking means by using the diffractive optical element in an optical system, the diffractive optical element having a grating structure obtained by stacking a plurality of diffraction gratings made of at least two type of materials with different dispersion properties to enhance diffraction efficiency for a particular design order throughout a predetermined wavelength region and a plurality of design wavelengths which exist in a predetermined design order and at which a maximum optical path length difference in the grating structure becomes an integer multiple of a wavelength, and the diffractive optical element having a design wavelength λ0 satisfying conditions given below:

$$U1,n(\lambda 0)-U1,r(\lambda 0)>0.75[U3,n(\lambda 0)-U3,r-1(\lambda 0)]$$

$$U1,n(\lambda 0)-U1,r(\lambda 0)>U3,n(\lambda 0)-U3,r(\lambda 0)$$

$$U1,n(\lambda 0)+U1,r(\lambda 0)>0.5[U2,n(\lambda 0)-U2,r-1(\lambda 0)]$$

$$U1,n(\lambda 0)-U1,r(\lambda 0)\geq U2,n(\lambda 0)-U2,r(\lambda 0)$$

(arbitrary integer satisfying 0<r<n)
U1,n(λ0), U2,n(λ0), and U3,n(λ0) being given by $$U1,n(\lambda 0) = \sum_{p=m-n}^{m+n} \int_{\lambda 1}^{\lambda 2} \{L(\lambda)T(\lambda)F1(\lambda)Dp(\lambda 0, \lambda)Sp(\lambda)\}d\lambda$$

$$U2,n(\lambda 0) = \sum_{p=m-n}^{m+n} \int_{\lambda 1}^{\lambda 2} \{L(\lambda)T(\lambda)F2(\lambda)Dp(\lambda 0, \lambda)Sp(\lambda)\}d\lambda$$

$$U3,n(\lambda 0) = \sum_{p=m-n}^{m+n} \int_{\lambda 1}^{\lambda 2} \{L(\lambda)T(\lambda)F3(\lambda)Dp(\lambda 0, \lambda)Sp(\lambda)\}d\lambda$$

and, U1,r(λ0), U2,r(λ0), and U3,r(λ0) being given by $$U1,r(\lambda 0) = \sum_{p=m-r}^{m+r} \int_{\lambda 1}^{\lambda 2} \{L(\lambda)T(\lambda)F1(\lambda)Dp(\lambda 0, \lambda)Sp(\lambda)\}d\lambda$$

$$U2,r(\lambda 0) = \sum_{p=m-r}^{m+r} \int_{\lambda 1}^{\lambda 2} \{L(\lambda)T(\lambda)F2(\lambda)Dp(\lambda 0, \lambda)Sp(\lambda)\}d\lambda$$

$$U3,r(\lambda 0) = \sum_{p=m-r}^{m+r} \int_{\lambda 1}^{\lambda 2} \{L(\lambda)T(\lambda)F3(\lambda)Dp(\lambda 0, \lambda)Sp(\lambda)\}d\lambda$$

for $$\int Dm(\lambda 0,\lambda)L(\lambda)T(\lambda)F1(\lambda)d\lambda = \int Dm(\lambda 0,\lambda)L(\lambda)T(\lambda)F2(\lambda)d\lambda = \int Dm(\lambda 0,\lambda)L(\lambda)T(\lambda)F3(\lambda)d\lambda$$

where

Dp(λ0, λ): a diffraction efficiency of a wavelength λ when a diffraction order of the diffractive optical element is represented by p and a design wavelength is represented by λ0, Dm(λ0, λ): a diffraction efficiency of the wavelength λ when the diffraction order of the diffractive optical element is represented by m and the design wavelength is represented by λ0, m: a design order, n: an order (n>0) contributing to flare, Σ: an addition symbol; although Σ in each equation states that values from P=m−n to P=m+n are added, p=m is not included, ∫: an integration symbol, λ1 and λ2: a shortest wavelength and longest wavelength in a predetermined wavelength region, Sp(λ): a contribution ratio at the wavelength λ of p-order diffracted light in a specific area on a light-receiving surface (an imaging position of a design order), L(λ): a spectral characteristic at the wavelength λ of a light beam incident on the optical system, T(λ): a transmittance of the optical system at the wavelength λ, and F1(λ), F2(λ), and F3(λ): spectral sensitivity characteristics of light-receiving means each serving to detect light in a given wavelength range in the picture taking means; a wavelength at which the spectral sensitivity becomes highest increases in the order of F1(λ), F2(λ), and F3(λ).

In one aspect of the present invention, the plurality of diffraction gratings stacked on each other preferably include at least one diffraction grating whose direction of an increasing or decreasing of a grating thickness differs from that of remaining diffraction gratings.

In one aspect of the present invention, the predetermined wavelength region is preferably a visible region.

Further, in one aspect of the present invention, the diffraction gratings are preferably stacked on a substrate, and when the stacked diffraction gratings are named as a first diffraction grating, a second diffraction grating, and an ith diffraction grating, starting from the diffraction grating close to the substrate, the first diffraction grating and the substrate are preferably made of the same material.

Further, in one aspect of the present invention, the optical system preferably comprises an imaging optical system.

Further, in another aspect of the present invention, there is provided a diffractive optical element which has a grating structure obtained by stacking a plurality of diffraction gratings made of at least two types of materials with different dispersion properties to enhance diffraction efficiency for a particular design order throughout a predetermined wavelength region and a plurality of design wavelengths which exist in a predetermined design order and at which a maximum optical path length difference in the grating structure becomes an integer multiple of a wavelength, and makes flare caused by diffracted light of an order other than the design wavelengths have a bluish hue like white tinted with blue.

Further, another aspect of the present invention preferably makes flare caused by diffracted light of an order other than design orders have a bluish hue like white tinted with blue.

Further, in another aspect of the present invention, an optical system preferably comprises the above diffractive optical element.

Further, in another aspect of the present invention, a picture taking apparatus preferably images an object on picture taking means by using the above optical system.

Further, in another aspect of the present invention, there is provided a diffractive optical element used in an optical system to form an image on picture taking means, the diffractive optical element having a grating structure obtained by stacking a plurality of diffraction gratings made of at least two types of materials with different dispersion properties to enhance diffraction efficiency for a particular design order throughout a predetermined wavelength region and a plurality of design wavelengths which exist in a predetermined design order and at which a maximum optical path length difference in the grating structure becomes an integer multiple of a wavelength, and the diffractive optical element having a design wavelength $\lambda 0$ satisfying conditions given below:

$$U1,n(\lambda 0)-U1,r(\lambda 0)>0.75[U3,n(\lambda 0)-U3,r-1(\lambda 0)]$$

$$U1,n(\lambda 0)-U1,r(\lambda 0)>U3,n(\lambda 0)-U3,r(\lambda 0)$$

$$U1,n(\lambda 0)-U1,r(\lambda 0)>0.5[U2,n(\lambda 0)-U2,r-1(\lambda 0)]$$

$$U1,n(\lambda 0)-U1,r(\lambda 0)\geq U2,n(\lambda 0)-U2,r(\lambda 0)$$

(arbitrary integer satisfying $0<r<n$)

$U1,n(\lambda 0)$, $U2,n(\lambda 0)$, and $U3,n(\lambda 0)$ being given by $$U1, n(\lambda 0) = \sum_{p=m-n}^{m+n} \int_{\lambda 1}^{\lambda 2} \{L(\lambda)T(\lambda)F1(\lambda)Dp(\lambda 0, \lambda)Sp(\lambda)\}d\lambda$$

$$U2, n(\lambda 0) = \sum_{p=m-n}^{m+n} \int_{\lambda 1}^{\lambda 2} \{L(\lambda)T(\lambda)F2(\lambda)Dp(\lambda 0, \lambda)Sp(\lambda)\}d\lambda$$

-continued $$U3, n(\lambda 0) = \sum_{p=m-n}^{m+n} \int_{\lambda 1}^{\lambda 2} \{L(\lambda)T(\lambda)F3(\lambda)Dp(\lambda 0, \lambda)Sp(\lambda)\}d\lambda$$

and, $U1,r(\lambda 0)$, $U2,r(\lambda 0)$, and $U3,r(\lambda 0)$ being given by $$U1, r(\lambda 0) = \sum_{p=m-r}^{m+r} \int_{\lambda 1}^{\lambda 2} \{L(\lambda)T(\lambda)F1(\lambda)Dp(\lambda 0, \lambda)Sp(\lambda)\}d\lambda$$

$$U2, r(\lambda 0) = \sum_{p=m-r}^{m+r} \int_{\lambda 1}^{\lambda 2} \{L(\lambda)T(\lambda)F2(\lambda)Dp(\lambda 0, \lambda)Sp(\lambda)\}d\lambda$$

$$U3, r(\lambda 0) = \sum_{p=m-r}^{m+r} \int_{\lambda 1}^{\lambda 2} \{L(\lambda)T(\lambda)F3(\lambda)Dp(\lambda 0, \lambda)Sp(\lambda)\}d\lambda$$

for $$\int Dm(\lambda 0,\lambda)L(\lambda)T(\lambda)F1(\lambda)d\lambda = \int Dm(\lambda 0,\lambda)L(\lambda)T(\lambda)F2(\lambda)d\lambda = \int Dm(\lambda 0,\lambda)L(\lambda)T(\lambda)F3(\lambda)d\lambda.$$

where
- $Dp(\lambda 0, \lambda)$: a diffraction efficiency of a wavelength $\lambda$ when a diffraction order of the diffractive optical element is represented by p and a design wavelength is represented by $\lambda 0$,
- $Dm(\lambda 0, \lambda)$: a diffraction efficiency of the wavelength $\lambda$ when the diffraction order of the diffractive optical element is represented by m and the design wavelength is represented by $\lambda 0$,
- m: a design order,
- n: an order ($n>0$) contributing to flare,
- $\Sigma$: an addition symbol; although $\Sigma$ in each equation states that values from $P=m-n$ to $P=m+n$ are added, $p=m$ is not included,
- $\int$: an integration symbol,
- $\lambda 1$ and $\lambda 2$: a shortest wavelength and longest wavelength in a predetermined wavelength region,
- $Sp(\lambda)$: a contribution ratio at the wavelength $\lambda$ of p-order diffracted light in a specific area on a light-receiving surface (an imaging position of a design order),
- $L(\lambda)$: a spectral characteristic at the wavelength $\lambda$ of a light beam incident on the optical system,
- $T(\lambda)$: a transmittance of the optical system at the wavelength $\lambda$, and
- $F1(\lambda)$, $F2(\lambda)$, and $F3(\lambda)$: spectral sensitivity characteristics of light-receiving means each serving to detect light in a given wavelength range in the picture taking means; a wavelength at which the spectral sensitivity becomes highest increases in the order of $F1(\lambda)$, $F2(\lambda)$, and $F3(\lambda)$.

Further, in the another aspect of the present invention, the plurality of diffraction gratings stacked on each other preferably include at least one diffraction grating whose direction of a grating of a grating shape differs from that of remaining diffraction gratings.

Further, in the another aspect of the present invention, the predetermined wavelength region is preferably a visible region.

Further, in the another aspect of the present invention, the diffraction gratings are preferably stacked on a substrate, and when the stacked diffraction gratings are named as a first diffraction grating, a second diffraction grating, and an ith diffraction grating, starting from the diffraction grating close to the substrate, the first diffraction grating and the substrate are preferably made of the same material.

BRIEF DESCRIPTION OF THE DRAWINGS

FIGS. 6A, 6B and 6C are views for explaining the image formation state of flare in the first embodiment of the present invention;

FIG. 10 is a view for explaining the color appearance of flare in the first embodiment of the present invention;

DETAILED DESCRIPTION OF THE PREFERRED EMBODIMENTS (First Embodiment)

Figure 1:
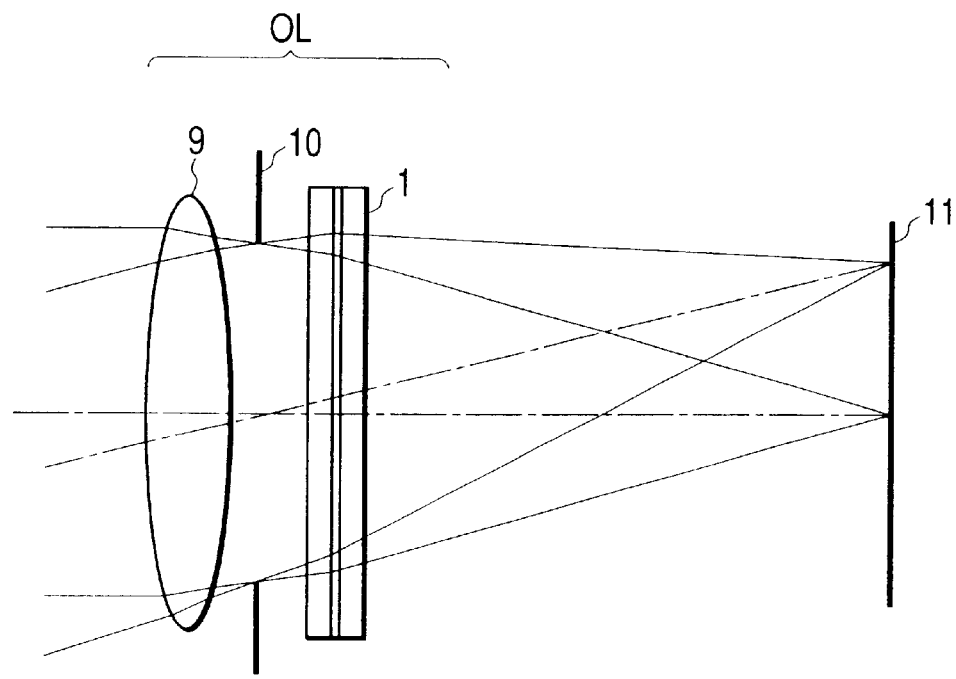
FIG. 1 is a schematic view of a picture taking apparatus using a diffractive optical element in the first embodiment of the present invention.

FIG. 1 is a view showing the arrangement of the main part of a picture taking apparatus using a diffractive optical element.

The optical system of this embodiment is applicable to various types of optical instruments such as picture taking, image reading, inspection, and observation instruments.

An optical system OL in FIG. 1 has at least one each of the following: a diffractive optical element (DOE) 1, refractive optical element 9 (lens in FIG. 1), and aperture 10. FIG. 1 shows a state wherein a light beam incident from an object onto the optical system OL is formed into an image on a light-receiving unit (picture taking means) 11.

Design-order diffracted light components from the diffractive optical element 1 are subjected to aberration correction such that good optical performance can be obtained in a predetermined wavelength region upon synthesis with the diffractive optical element 9. The light-receiving unit 11 is comprised of a plurality of light-receiving members having different spectral sensitivities and configured to obtain a color image by synthesizing images from the light-receiving members having different spectral sensitivities.

Figure 8:
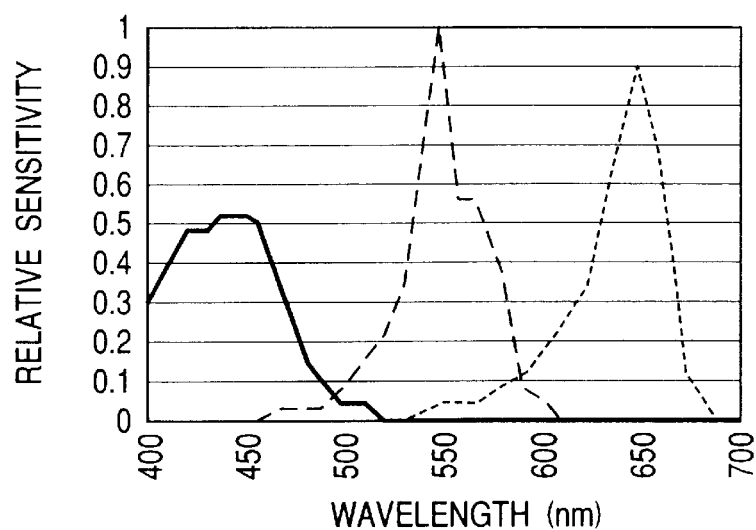
FIG. 8 is a graph for explaining the spectral characteristics of a general color film in the present invention.

As the light-receiving unit 11, a CCD, silver halide film, photosensitive member, the human eye, or the like is generally used. For example, FIG. 8 shows three spectral sensitivities of R (Red), G (Green), and B (Blue) of a general silver halide color film in a visible region. The light-receiving unit 11 has three light-receiving means generally having sensitivities in three different wavelength bands and reproduces a color image by mixing images from these light-receiving means. A silver halide film is made up of three photosensitive layers respectively having peak sensitivities in blue, green, and red. The CCD is also made up of three sensors respectively having peak sensitivities in blue, green, and red.

The light-receiving means respectively having peak sensitivities in blue, green, and red will be referred to as first, second, and third light-receiving means hereinafter.

Although FIG. 1 shows a diffractive optical element having a diffraction grating formed on a flat plate, a diffractive optical element formed on a curved surface such as a lens may be used.

Figure 2:
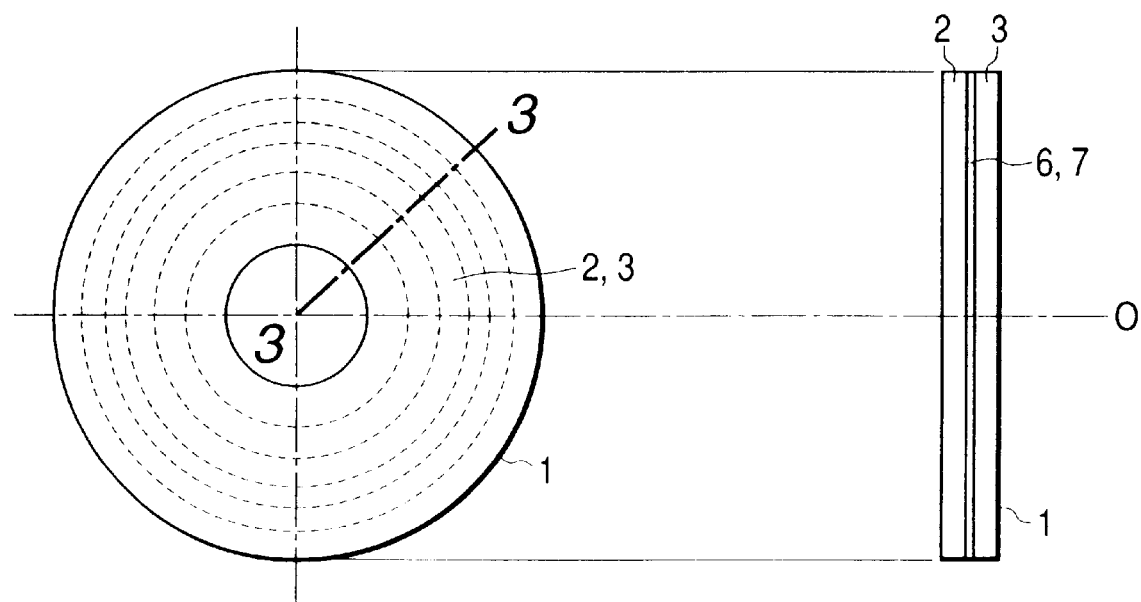
FIG. 2 is a front view of the main part of the diffractive optical element in the first embodiment of the present invention.

FIG. 2 shows front and side views of the diffractive optical element 1 used in this embodiment. The diffractive optical element 1 has first and second diffractive optical elements 2 and 3 located close to each other.

Referring to FIG. 2, the diffraction grating has a concentric grating shape whose grating pitch is gradually reduced from the center to the periphery so as to have a lens effect.

Figure 3:
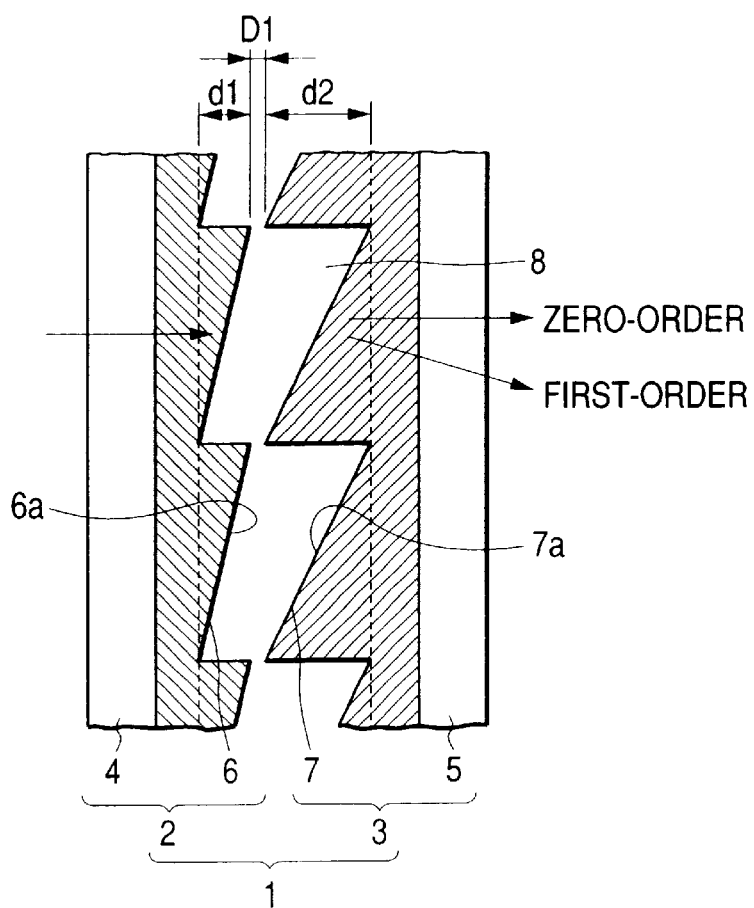
FIG. 3 is a view for explaining the sectional diffraction grating shape of the diffractive optical element in the first embodiment of the present invention.

FIG. 3 is a sectional view taken along a line 3—3 of the diffractive optical element 1 in FIG. 2, showing part of its cross-section. FIG. 3 is a view considerably deformed (exaggerated) in the depth direction as compared with the pitch direction.

According to the cross-sectional grating shape of the diffraction grating of the diffractive optical element 1 in this embodiment, the first diffractive optical element 2 having a diffraction grating surface 6a formed at the interface portion between a first layer (diffraction grating) 6 formed on a substrate 4 and an air layer 8 is located, through the air layer 8, close to the second diffractive optical element 3 having a diffraction grating surface 7a formed at the interface portion between a second layer (diffraction grating) 7 formed on a substrate 5 and the air layer 8. A characteristic feature of this structure is that all the layers function as one diffractive optical element.

With this arrangement, a technique of forming a single-layer diffractive optical element can be used for the diffraction gratings 6 and 7 of the respective diffractive optical elements. In the prior art in which a diffraction grating portion is formed at the interface between two materials, materials that satisfy requirements for various characteristics such as adhesion properties and expansion coefficient in addition to optical characteristics must be used. In contrast to this, according to the above diffractive optical element having the multilayered structure, since materials to be used basically need to satisfy only requirements for optical characteristics, the range of material selection expands, providing an advantage in the formation of an element.

The diffraction efficiency of the diffractive optical element of the present invention will be described next.

Figure 13:
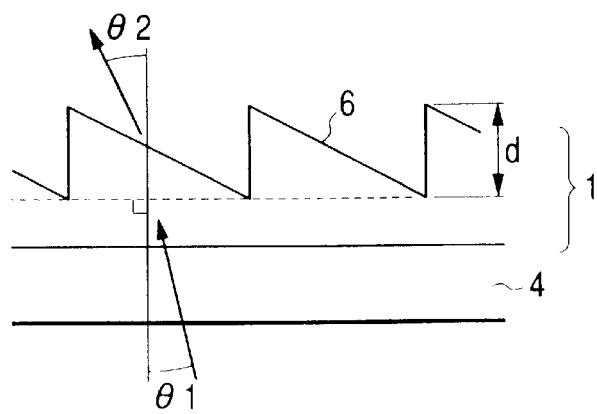
FIG. 13 is a view for explaining a conventional grating shape (in the form of a triangular wave)
Figure 14:
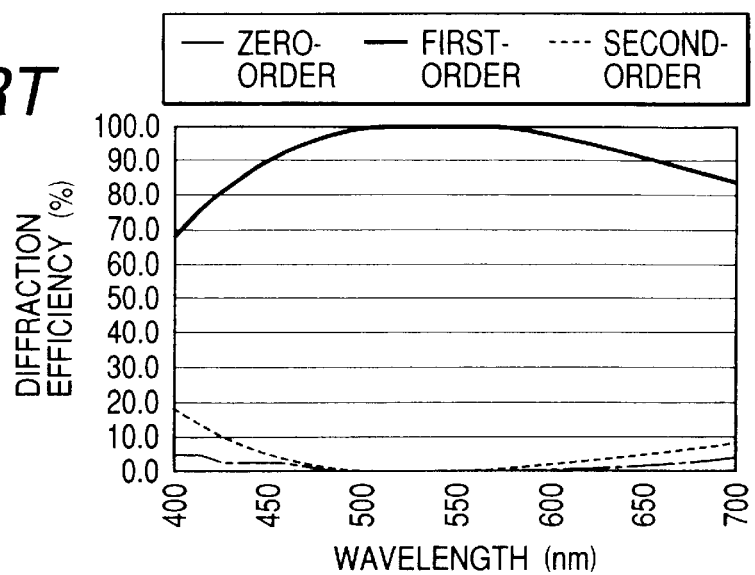
FIG. 14 is a graph for explaining the diffraction efficiency of a conventional optical system.
Figure 15:
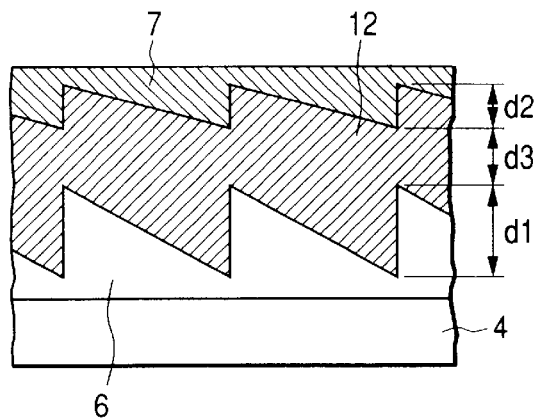
FIG. 15 is a view for explaining a cross-sectional shape of a conventional multilayered diffractive optical element.
Figure 16:
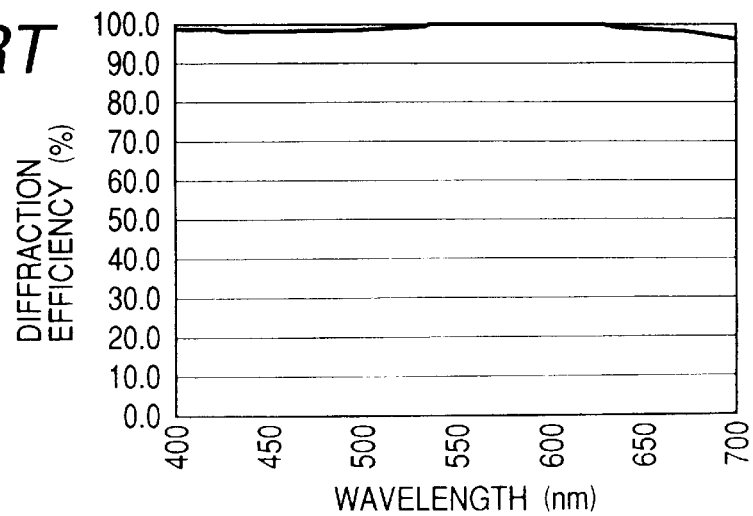
FIG. 16 is a graph for explaining the diffraction efficiency of the conventional multilayered diffractive optical element.
Figure 17:
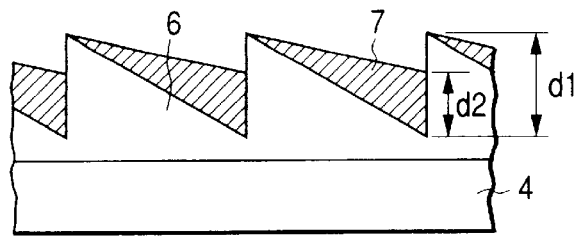
FIG. 17 is a view for explaining a cross-sectional shape of the conventional multilayered diffractive optical element.

In the conventional single-layer transmission type diffractive optical element 1 in FIG. 13, the condition in which the diffraction efficiency reaches its maximum value (100%) at a design wavelength λ0 is that when a light beam is vertically incident on the grating (substrate 2) 6, the optical path length difference between rays passing through a peak and valley of the diffraction grating 6 becomes an integer multiple of the wavelength. This condition can be given by $$(n01-1)d = m\lambda 0 \quad (1)$$

where n01 is the refractive index of the material of the diffraction grating 6 at the wavelength λ0, d is the grating thickness, and m is the diffraction order (design diffraction order).

The above condition basically applies to a diffractive optical element like the one shown in FIG. 3, which has the structure in which the plurality of gratings 6 and 7 are stacked on each other. That is, in order to make all the layers function as one diffraction grating, the sum of the optical path length differences between peaks and valleys of the diffraction gratings formed at the interfaces between the respective materials throughout all the layers is determined to be an integer multiple of the wavelength. When a light beam is vertically incident on the substrate of the diffractive optical element 1 having the multilayered structure shown in FIG. 3, therefore, a conditional expression for the maximum diffraction efficiency is given by $$\pm(n01-1)d1 \pm (n02-1)d2 = m\lambda 0 \quad (2)$$

where n01 is the refractive index of the material of the first diffraction grating 6 at the wavelength λ0, n02 is the refractive index of the material of the second diffraction grating 7 at the wavelength λ0, and d1 and d2 are the grating thicknesses of the first and second diffraction gratings 6 and 7, respectively. Assume that the downward diffraction direction with respect to the zero-order diffracted light component in FIG. 3 corresponds to a positive diffraction order. In this case, the plus/minus sign for each layer in equation (2) becomes positive in a grating shape (diffraction grating 7 in FIG. 3) in which the grating thickness increases downward as shown in FIG. 3, and becomes negative in a grating shape (diffraction grating 6 in FIG. 3) in which the grating thickness increases upward.

In the above arrangement, a diffraction efficiency η(λ) at a wavelength λ other than the design wavelength λ0 is given by $$\eta(\lambda) = sinc^2[\pi[M-[\pm(n1(\lambda)-1)d1\pm(n2(\lambda)-1)d2]/\lambda]] = sinc^2[\pi[M-\Phi(\lambda)/\lambda]] \quad (3)$$

where M is the evaluation diffraction order, n1(λ) is the refractive index of the first grating at the wavelength λ, n2(λ) is the refractive index of the second diffraction grating at the wavelength λ, and d1 and d2 are the grating thicknesses of the first and second diffraction gratings, respectively. In addition, sinc(x)=sin(x)/x.

Referring to FIG. 3, the diffraction grating surfaces 6a and 7a are formed at the interfaces between the layers and air. However, in order to achieve the object of the present invention, the present invention is not limited to this and may have a diffraction grating whose diffraction grating surface is formed on the interface surface between two different materials. In general, a diffraction grating surface is preferably formed on the interface surface between a material and an air layer from the above point of view of manufacturing.

Diffracted light components of unnecessary orders (diffracted light components of orders other than the design order) that cause color flare will be described next. Consideration of the multilayered structure shown in FIG. 3 as a multilayered diffractive optical element of the present invention for an explanation of the diffraction efficiency of diffracted light components of unnecessary orders (unnecessary-order light components) will be described hereinafter.

The first diffractive optical element 2 has the following arrangement. Assume that an ultraviolet curable resin (nd=1.635, vd=23.0) is used as a material for the grating portion 6, and the grading thickness d1 is 7.88 μm.

Likewise, the second diffractive optical element 3 has the following arrangement. Assume that ultraviolet curable resin C001 available from DAINIPPON INK & CHEMICALS, INC. (nd=1.524, vd=50.8) is used as a material for the grating portion 7, and the grading thickness d2 is 10.71 μm.

Figure 4:
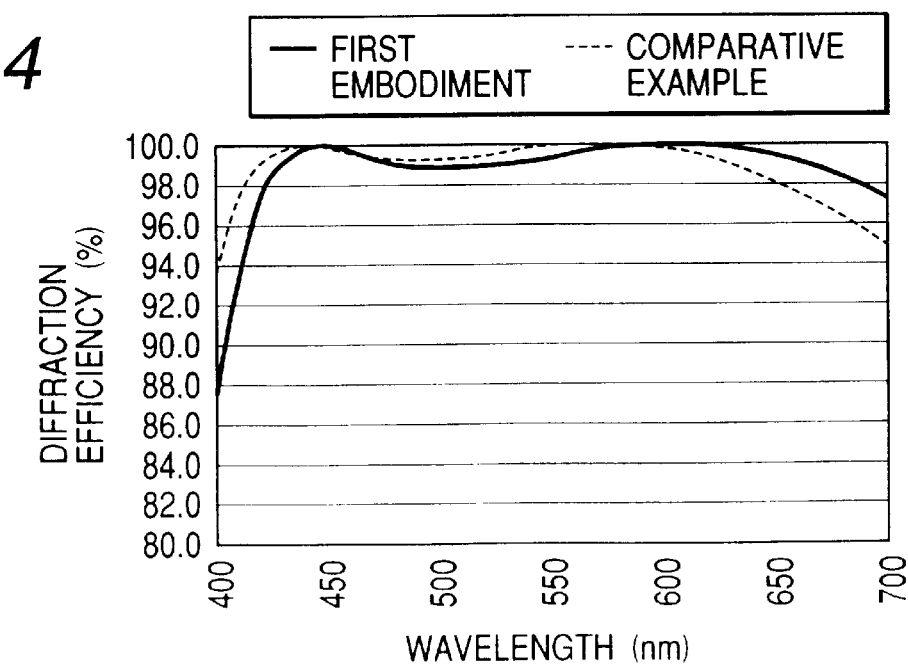
FIG. 4 is a graph for explaining the diffraction efficiencies of the design orders of the diffractive optical element in the first embodiment of the present invention.

The design order m is first order. FIG. 4 shows the diffraction efficiency with this design order. In this case, there are two design wavelengths in the visible region, i.e., 447 nm and 608 nm in increasing order of wavelength. As is obvious from FIG. 4, the diffraction efficiency is 100% at the design wavelengths, 477 nm and 608 nm.

Figure 5:
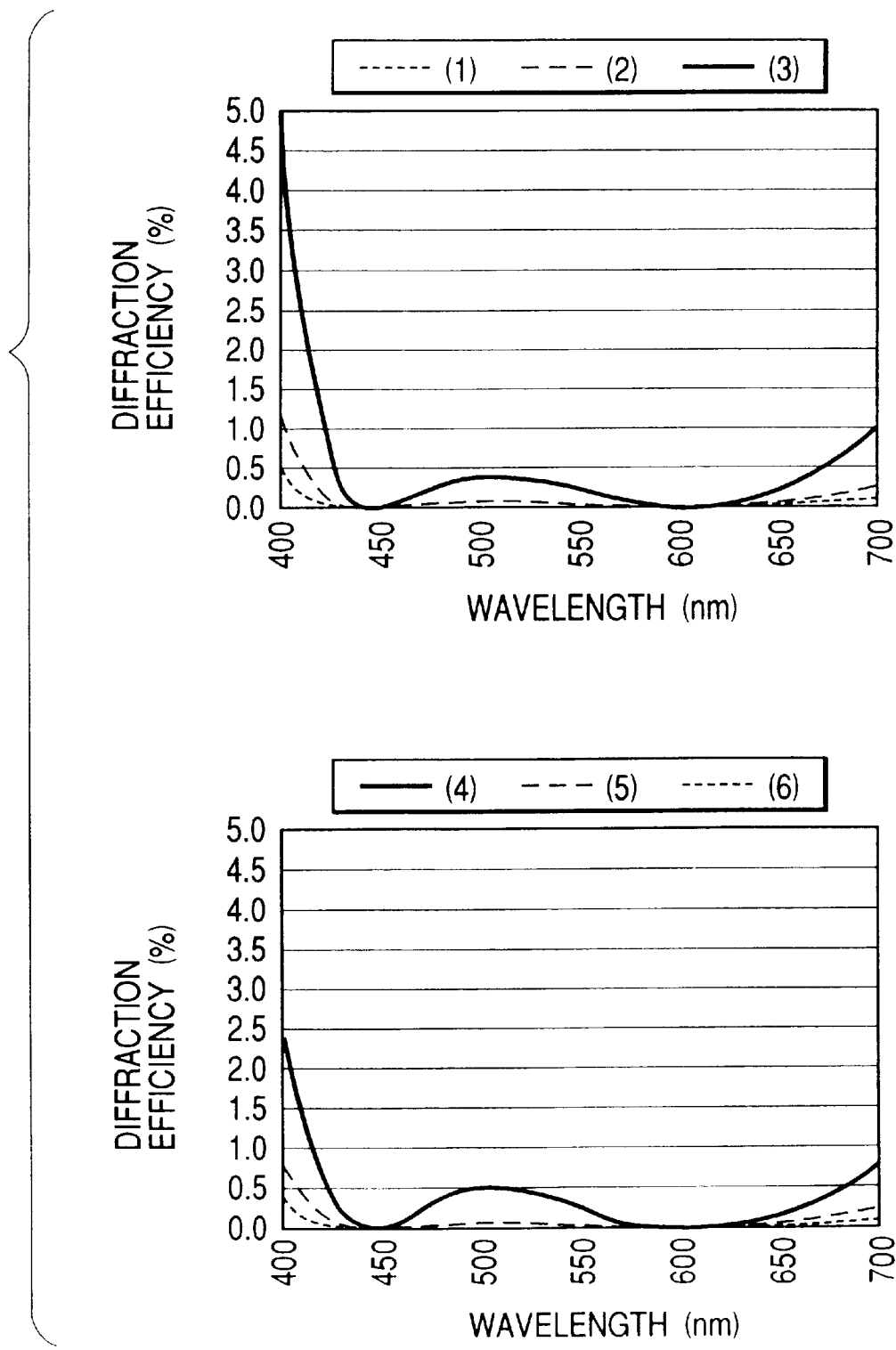
FIG. 5 is a graph for explaining the diffraction efficiencies of unnecessary diffraction orders of the diffractive optical element in the first embodiment of the present invention.

FIG. 5 shows the diffraction efficiencies of unnecessary-order light components. Referring to FIG. 5, (1) to (6) represent the diffraction efficiencies of -second-order, -first-order, zero-order, second-order, third-order, and fourth-order diffracted light components.

As is obvious, at the design wavelengths, 447 nm and 608 nm, no unnecessary diffracted light components exist; as the diffraction efficiency of first-order (design-order) diffracted light component decreases, the diffraction efficiencies of diffracted light components of orders other than the first order increase.

That is, diffracted light components of unnecessary orders other than the design order are produced. In addition, as is apparent from FIG. 5, with regards to the -second-order, -first-order, zero-order, second-order, third-order, and fourth-order diffracted light components, as the orders are separated from the design order (first order), the diffraction efficiency obviously decreases. Therefore, flare light weakens, and its influence decreases. That is, the influences of the orders (zero and second orders) next to the design order are largest.

The image formation states of the above unnecessary-order diffracted light components will be described next. FIGS. 6A to 6C show the image formation states of diffracted light components of the respective orders. FIG. 6A shows the image formation states of diffracted light components of the design order and unnecessary orders near the design order. FIG. 6B shows the image formation states viewed from the optical axis direction. FIG. 6C show the light intensity states of unnecessary-order light components at the respective light-receiving positions. These states will be sequentially described in detail below.

For the sake of descriptive simplicity, the image formation state of a light beam on the optical axis will be exemplified. Assume that three color beams, i.e., blue (B), green (G), and red (R) light beams, are required to form a color image, and are respectively represented by light beams having single wavelengths of 450 nm, 550 nm, and 650 nm. Assume also that the design diffraction order is the first order (diffracted light).

FIG. 6A shows the image formation states of light beams of the respective orders. Referring to FIG. 6A, a light beam 1c is the design-order light beam, which is focused on the axis on the imaging plane (photosensitive surface) 11. Since this light beam 1c has undergone proper chromatic aberration correction, although it exhibits differences in image formation state between aberration levels, differences in image formation state between wavelengths can be neglected as compared with the image formation state of color flare which is currently presenting a problem. Diffracted light components of orders higher than the design order are diffracted more by a diffraction plane.

FIG. 6A shows the image formation states of second-order diffracted light components 2b, 2g, and 2r and third-order diffracted light components 3b, 3g, and 3r.

In practice, other diffracted light components of higher orders and orders (zero order, -first order, and the like) lower than the design order overlap each other to eventually produce flare. Since this operation demands a complicated explanation, only the diffracted light components of the above two unnecessary orders (second and third orders) will be described below.

Light beams of diffraction orders other than the design order have not undergone chromatic aberration correction upon synthesis with a refractive lens, and hence differ in their diffractive angles depending on the wavelengths. Therefore, the B, G, and R component of second-order diffracted light are formed into images at different areas on the imaging plane 11 as indicated by 2b, 2g, and 2r, respectively.

FIG. 6B shows the above image formation states from the direction of an optical axis La. As is obvious from FIG. 6B, the image formation state of the R component (r) is blurred more than the B component (b).

Likewise, third-order diffracted light is diffracted more than second-order diffracted light, and the third-order diffracted light is blurred more than the second-order diffracted light when it is focused on the imaging plane 11, with the B, G, and R components of the third-order diffracted light being indicated by 3b, 3b, and 3r, respectively. The same phenomenon occurs with respect to orders lower than the design order. As the order of diffracted light is separated from the design order, the light is blurred more, and the R component of each order is blurred more than the B component thereof. That is, -first-order diffracted light is blurred more than zero-order diffracted light, and -second-order diffracted light is blurred more than -first-order diffracted light.

FIG. 6C shows flare intensities in the respective areas when flare occurs. Referring to FIG. 6C, reference symbol a denotes an area where the flare of the R, G, and B components of the second-order and the third-order diffracted light exists; b, an area where the flare of the B component of the second-order diffracted light does not exist but the flare of the G and R components of the second-order diffracted light and the R, G, and B components of the third-order diffracted light exists; c, an area where the flare of the B and G components of the second-order diffracted light does not exist but the flare of the R component of the second-order diffracted light and the R, G, and B components of the third-order diffracted light exists; d, an area where the flare of the second-order diffracted light does not exist but the flare of the R, G, and B components of the third-order diffracted light exists, e, an area where the flare of the B component of the third-order diffracted light does not exist but the flare of the G and R components of the third-order diffracted light exists; and f, an area where the flare of the B and G components of the third-order diffracted light does not exist but the flare of the R component of the third-order diffracted light exists.

With regard to the color appearances of the respective areas, an embodiment of the previous application associated with the flare light caused by a multilayered diffractive optical element proposed by the present applicant as Japanese Patent Application No. 11-344369 (Japanese Patent Application Laid-Open No. 2000-241614) and an embodiment of the present invention will be described next.

According to the previous application, the element is configured to reduce the B, G, and R components of flare light of orders (zero and second orders in the above description) next to the design order while reducing the differences of integral light intensity read by a light-receiving member in the B, G, and R components. In addition, although only diffraction efficiency values are written in the previous application, the differences in color flare between the B, G, and R components of diffracted light of each of (m±2)th-order or more when the design order is m tend to become equal to those of (m±1)th-order diffracted light. In addition, as the order is separated from the design order, the diffraction efficiency greatly decreases.

The color appearance of each area will be qualitatively described below. As is obvious from FIG. 6C, in the area a, the flare is produced by the superimposition of flare components of all diffraction orders and all wavelengths. Consider light components of three colors of the second-order diffracted light. Although they are almost equal in integral light intensity, since the wavelength of the B component is blurred less than the other components on the photosensitive surface 11, the color appearance of the flare of the second-order diffracted light per unit area in the area a becomes white slightly tinted with blue. The third-order diffracted light is superimposed on this flare of the second-order diffracted light. Considering only the third-order diffracted light, however, it exhibits a color appearance similar to that of the second-order diffracted light. Therefore, the color appearance of the area a becomes white slightly tinted with blue.

The area b is an area where the B component of the second-order diffracted light does not exist at all. Therefore, flare light components that contribute to this area are a diffracted light component of an order equal to or higher than the third order and the G and R components of the second-order diffracted light. In the previous application, third-order diffracted light is lower in intensity than second-order diffracted light, and blurring is larger, and hence the B component of this area b is considerably smaller in intensity than the G and R components. Consequently, the color appearance of the area b becomes considerably vivid yellow.

The color appearance of the area c will be described next. This area is an area where the B and G components of the second-order diffracted light do not exit at all. Therefore, flare light components that contribute to the area c are only diffracted light of an order equal to or higher than the third order and the R component of the second-order diffracted light. Like area b, the R component of the second-order diffracted light is higher in intensity than the B and G components of the third-order diffracted light components, and the color appearance of the flare becomes vivid red. The color appearances of the areas d, e, and f to which the third-order diffracted light contributes become white, yellow, and red in the order named as in the case of the second-order diffracted light although the absolute light intensities decrease.

In general use, since the flare intensity is greatly reduced by using a diffractive optical element having a multilayered structure, the above flare is not produced in a read image.

Under a special picture taking condition like that described above, flare may be produced, and noticeable (high-visibility) color flare such as yellow or red flare may be produced once flare is produced.

Color flare in the embodiment of the present invention will be described next. The present invention is configured to correct the color appearance of color flare. According to a qualitative explanation, the color appearance of yellow or red flare in the previous application is changed into flare with a less noticeable bluish color appearance.

More specifically, in the area c shown in FIG. 6C, the flare intensities of the respective orders are adjusted such that the flare intensity of the red component of the second-order diffracted light per unit area becomes almost equal to that of the blue component of the third-order diffracted light. With this adjustment, the color appearances of the respective areas in FIG. 6C are sequentially made to become blue, white, purple, blue, white, and purple, starting from the area a, thus making the respective flare components have less noticeable color appearances.

The above description is based on various assumptions to make the characteristics of the present invention easier to understand. In an actual system, since each color has a certain wavelength width instead of a single wavelength, the states of blurring on the imaging plane change depending on the wavelengths. For this reason, the color appearance of flare gradually changes as well. For the sake of a simple explanation of diffracted light, the case where only second- and third-order diffracted light components near a design-order (first-order) light component exist have been exemplified. In practice, however, diffracted light components of orders equal to or higher than the third order contribute to the respective areas, and flare components of orders lower than the design order, e.g., zero order and -first order, exist as flare light components like flare components of higher orders. By giving consideration to these phenomena, the color appearance of flare can be made to become similar to the actual color appearance of flare, thus improving correction precision. Although flare of a light beam on the axis has been described above, the color appearances of off-axis light beams can also be evaluated in the same manner as described above.

In the case of off-axis light beams, unlike on-axis light beams, the respective flare components may not concentrically overlap each other, or the respective color flare components of the respective orders may have light intensity irregularity in a blurring area. In this case as well, color appearance setting can be made by detecting a specific position where a flare component exists and its specific order and wavelength and accurately calculating the contribution ratio of the flare per unit area.

A procedure for optimally combining a plurality of design wavelengths λ0 to properly correct the color appearance of color flare and the function of each combination of design wavelengths will be sequentially described next. The spectral characteristics of an arrangement using a diffractive optical element will be described first. The spectral characteristics of a general conventional picture taking optical system are determined by the spectral characteristics of a light source or external light, the spectral sensitivity characteristics of a picture taking means, and the transmittance of a lens (picture taking optical system). When the picture taking means is constituted by three light-receiving means for receiving light components in three wavelength ranges, the spectral characteristics of the picture taking optical system are respectively defined as follows:

$$L(\lambda)F1(\lambda)T(\lambda) \tag{4-1}$$

$$L(\lambda)F2(\lambda)T(\lambda) \tag{4-2}$$

$$L(\lambda)F3(\lambda)T(\lambda) \tag{4-2}$$

where $L(\lambda)$ represents the spectral characteristic at the wavelength λ of a light beam from the light source, $F1(\lambda)$, $F2(\lambda)$, and $F3(\lambda)$ represent the spectral sensitivity characteristics of the first, second, and third light-receiving means at the wavelength λ, and $T(\lambda)$ is the transmittance of the picture taking optical system at the wavelength λ. The relationship between the respective mathematical expressions is given by $$\int L(\lambda)F1(\lambda)T(\lambda)d\lambda = \int L(\lambda)F2(\lambda)T(\lambda)d\lambda = \int L(\lambda)F3(\lambda)T(\lambda)d\lambda \tag{5}$$

Colors are mixed while outputs from the respective light-receiving means are equalized, thereby performing color reproduction with a proper color balance.

Figure 7:
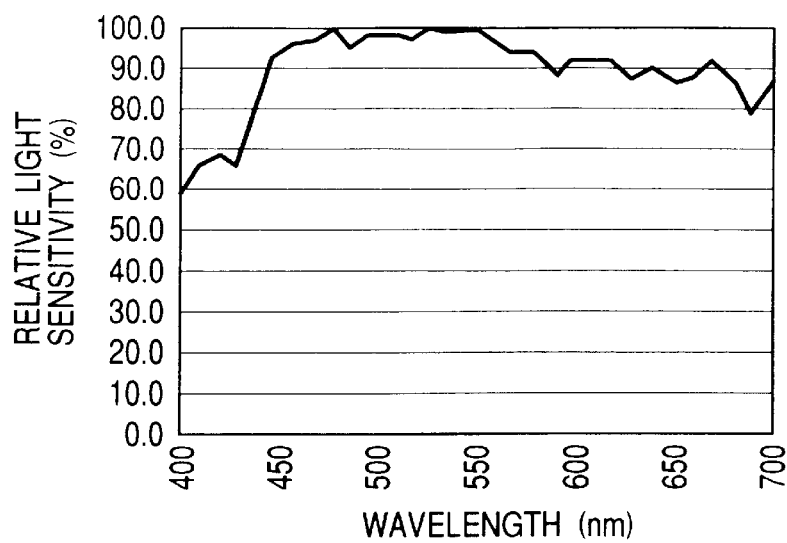
FIG. 7 is a graph for explaining the spectral characteristics of a white light source in the present invention.
Figure 9:
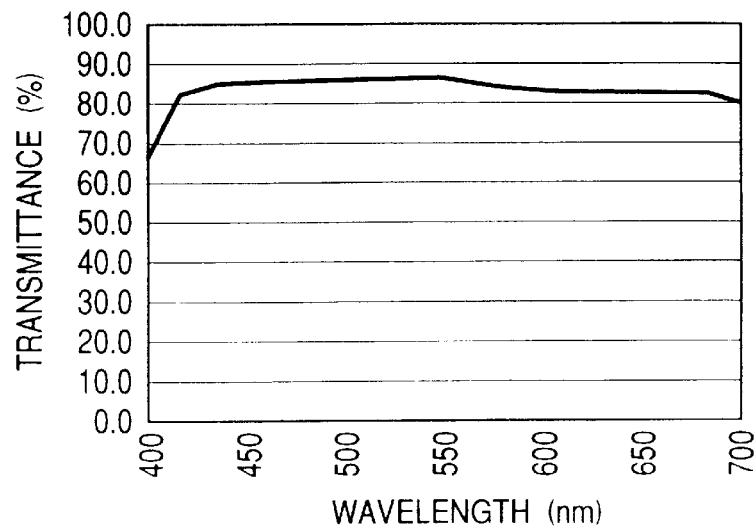
FIG. 9 is a graph for explaining the spectral transmittance of a lens in the present invention.

In this case, when the conditions of the first embodiment of the present invention are satisfied, i.e., the light source has the spectral characteristics of a white light source (D65) shown in FIG. 7, the picture taking means has the spectral characteristics of a general color film shown in FIG. 8, and the transmittance of the lens exhibits the spectral characteristics shown in FIG. 9, $L(\lambda)$, $F1(\lambda)$, $F2(\lambda)$, $F3(\lambda)$, and $T(\lambda)$ are calculated to equalize the integral light intensities.

If a DOE is used in the picture taking optical system, the factor of diffraction efficiency $Dm(\lambda)$ of the design order m of the DOE is added to the above factors. The diffraction efficiency $Dm(\lambda)$ can be written as $Dm(\lambda 0, \lambda)$ by the design wavelength λ0 and arbitrary wavelength λ as parameters. Therefore, the spectral characteristics of the system using the DOE with the design wavelength λ0 can be defined by $$Dm(\lambda 0,\lambda)L(\lambda)F1(\lambda)T(\lambda) \tag{6-1}$$

$$Dm(\lambda 0,\lambda)L(\lambda)F2(\lambda)T(\lambda) \tag{6-2}$$

$$Dm(\lambda 0,\lambda)L(\lambda)F3(\lambda)T(\lambda) \tag{6-3}$$

Obviously, since color reproduction with a proper color balance is performed by equalizing outputs from the light-receiving means while the DOE is incorporated in the optical system, an equation similar to equation (5) is established:

$$\int Dm(\lambda 0, \lambda)L(\lambda)F1(\lambda)T(\lambda)d\lambda = \int Dm(\lambda 0,\lambda)L(\lambda)F2(\lambda)T(\lambda)d\lambda = \int Dm(\lambda 0, \lambda)L(\lambda)F3(\lambda)T(\lambda)d\lambda \tag{7}$$

The spectral characteristics of unnecessary-order diffracted light components can be defined by using this equation.

The spectral characteristics of a p-order light component as an unnecessary-order diffracted light component can be defined by $$Dp(\lambda 0,\lambda)L(\lambda)F1(\lambda)T(\lambda) \tag{8-1}$$

$$Dp(\lambda 0,\lambda)L(\lambda)F2(\lambda)T(\lambda) \tag{8-2}$$

$$Dp(\lambda 0,\lambda)L(\lambda)F3(\lambda)T(\lambda) \tag{8-3}$$

The flare amount in a specific area is defined from the spectral characteristics defined in this manner. Since the value represented by spectral characteristics is the energy of light having the wavelength λ which is recorded on a light-receiving member after passing through the optical system, the energy of light associated with flare can be obtained by integrating the spectral characteristics at all wavelengths λ in the photosensitive area.

The flare amount in a specific area in the present invention is defined by the value obtained by weighting the flare amounts of the respective orders represented by mathematical expressions (8-1) to (8-3) with a weight $Sp(\lambda)$ set in consideration of the image formation state corresponding to each wavelength, integrating the resultant values in all wavelength ranges, and adding the integral values corresponding to the necessary number of orders.

The color flare amounts in specific areas in the first to third light-receiving means can be expressed by equations (9-1) to (9-3).

A weight (also called a contribution ratio) $Sp(\lambda)$ is expressed as follows in consideration of an image formation state. Assume that the unit area of an area where color flare of interest is produced is represented by s, and p-order diffracted light having the wavelength $\lambda$ contributes to a light beam that influences the color flare. In this case, letting $sp(\lambda)$ be the spread area of a light beam on the evaluation surface (the film surface described above) for the diffracted light, $Sp(\lambda)=s/sp(\lambda)$ The color flare amount in the specific area where light is received by the first light-receiving means: $U1,n(\lambda 0)$:

$$U1, n(\lambda 0) = \sum_{p=m-n}^{m+n} \int_{\lambda 1}^{\lambda 2} \{L(\lambda)T(\lambda)F1(\lambda)Dp(\lambda 0, \lambda)Sp(\lambda)\}d\lambda \quad (9-1)$$

The color flare amount in the specific area where light is received by the second light-receiving means: $U2,n(\lambda 0)$:

$$U2, n(\lambda 0) = \sum_{p=m-n}^{m+n} \int_{\lambda 1}^{\lambda 2} \{L(\lambda)T(\lambda)F2(\lambda)Dp(\lambda 0, \lambda)Sp(\lambda)\}d\lambda \quad (9-2)$$

The color flare amount in the specific area where light is received by the third light-receiving means: $U3,n(\lambda 0)$:

$$U3, n(\lambda 0) = \sum_{p=m-n}^{m+n} \int_{\lambda 1}^{\lambda 2} \{L(\lambda)T(\lambda)F3(\lambda)Dp(\lambda 0, \lambda)Sp(\lambda)\}d\lambda \quad (9-3)$$

Obviously, when calculating the above color flare amounts $U1,n(\lambda 0)$, $U2,n(\lambda 0)$, and $U3,n(\lambda 0)$, only diffracted light components of unnecessary orders other than the design order are calculated. Therefore, in calculation with "$\Sigma$", p=m is also added according to the equation. In practice, however, since p=m is the design order, this value is excluded.

In this case, values corresponding to all the diffraction orders that make contributions as necessary orders n are preferably added. However, the absolute value of diffraction efficiency of an order decreases as it is separated from the design order, and the flare on the light-receiving surface is blurred more, resulting in a decrease in contribution ratio in the specific area. Therefore, n=4 or the like will suffice as the number of orders to be considered.

If, therefore, the design order m is the first order, the orders subjected to calculation are first order ±fourth order, i.e., from -third-order light to fifth-order light.

To make color flare unnoticeable, which is the object of the present invention, the design wavelength $\lambda 0$ of a multilayered DOE may be set to satisfy the following conditional expressions:

$$U1,n(\lambda 0)-U1,r(\lambda 0)>0.75[U3,n(\lambda 0)-U3,r-1(\lambda 0)] \quad (10)$$

$$U1,n(\lambda 0)-U1,r(\lambda 0)>U3,n(\lambda 0)-U3,r(\lambda 0) \quad (11)$$

$$U1,n(\lambda 0)-U1,r(\lambda 0)>0.5[U2,n(\lambda 0)-U2,r-1(\lambda 0)] \quad (12)$$

$$U1,n(\lambda 0)-U1,r(0)\geq U2,n(\lambda 0)-U2,r(\lambda 0) \quad (13)$$

$U1,r(\lambda 0)$, $U2,r(\lambda 0)$ $U3,r(\lambda 0)$ are expressed as follows:

$$U1, r(\lambda 0) = \sum_{p=m-r}^{m+r} \int_{\lambda 1}^{\lambda 2} \{L(\lambda)T(\lambda)F1(\lambda)Dp(\lambda 0, \lambda)Sp(\lambda)\}d\lambda$$

$$U2, r(\lambda 0) = \sum_{p=m-r}^{m+r} \int_{\lambda 1}^{\lambda 2} \{L(\lambda)T(\lambda)F2(\lambda)Dp(\lambda 0, \lambda)Sp(\lambda)\}d\lambda$$

$$U3, r(\lambda 0) = \sum_{p=m-r}^{m+r} \int_{\lambda 1}^{\lambda 2} \{L(\lambda)T(\lambda)F3(\lambda)Dp(\lambda 0, \lambda)Sp(\lambda)\}d\lambda$$

(Arbitrary Integer Satisfying 0<r <n)

Conditional expression (10) is associated with color flare components in areas b, c, e, and f in the description given with respect to FIG. 6C.

If this expression is satisfied, the hues of the areas b and e change from green to white, and the hues of the areas c and f change from white to purple.

Conditional expression (11) is associated with the color flare components in the areas a and d in the description given with reference to FIG. 6C, and represents a condition for setting a bluish hue.

Conditional expression (12) is associated with the color flare components in the areas b and e in the description given with reference to FIG. 6C, and represents a condition for changing an area with a blue hue into an area with a white hue.

Conditional expression (13) is associated with color flare components in the areas a and d in the description given with reference to FIG. 6C, and represents a condition for setting a bluish hue, together with conditional expression (11).

If design wavelengths are optimally combined to satisfy the requirements for flare amounts as described above, any color flare that is caused can be changed into flare with low visibility, thereby obtaining a good picture taking optical system even under a special picture taking condition.

In applying the diffractive optical element of the present invention to an observation system without any picture taking means, e.g., a finder system, the color flare in the observation system can be evaluated by using three stimulus values in the CIE RGB color matching functions with respect to $F1(\lambda)$, $F2(\lambda)$, and $F3(\lambda)$.

FIG. 4 shows the diffraction efficiencies of the design order (first order) for realizing color flare in the previous application (Japanese Patent Application Laid-Open No. 2000-241614) as a comparative example and this embodiment. As compared with the previous application, the diffraction efficiency of blue is decreased, and the diffraction efficiency of red is increased.

Figure 18A:
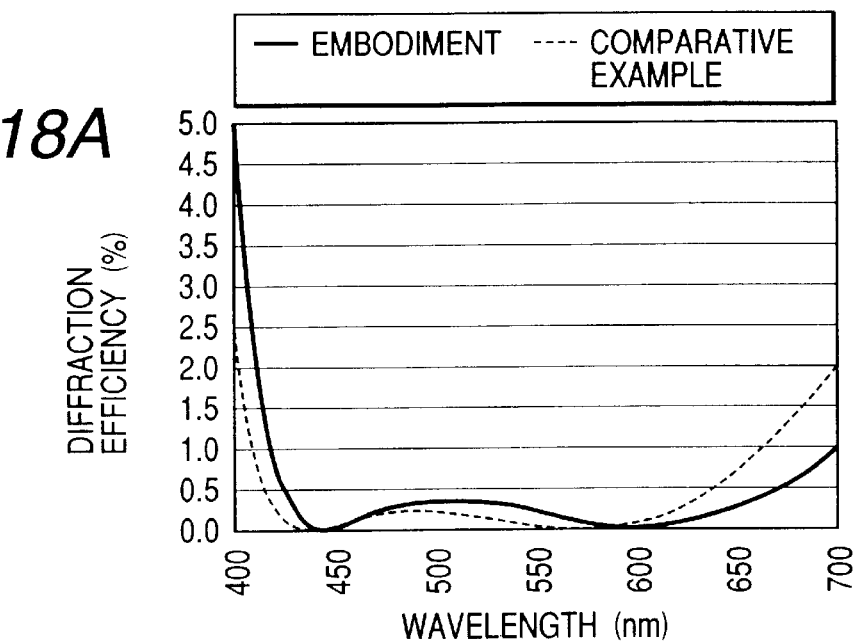
FIGS. 18A and 18B are graphs for explaining the diffraction efficiencies of diffractive optical elements according to the comparative example and the present invention.
Figure 18B:
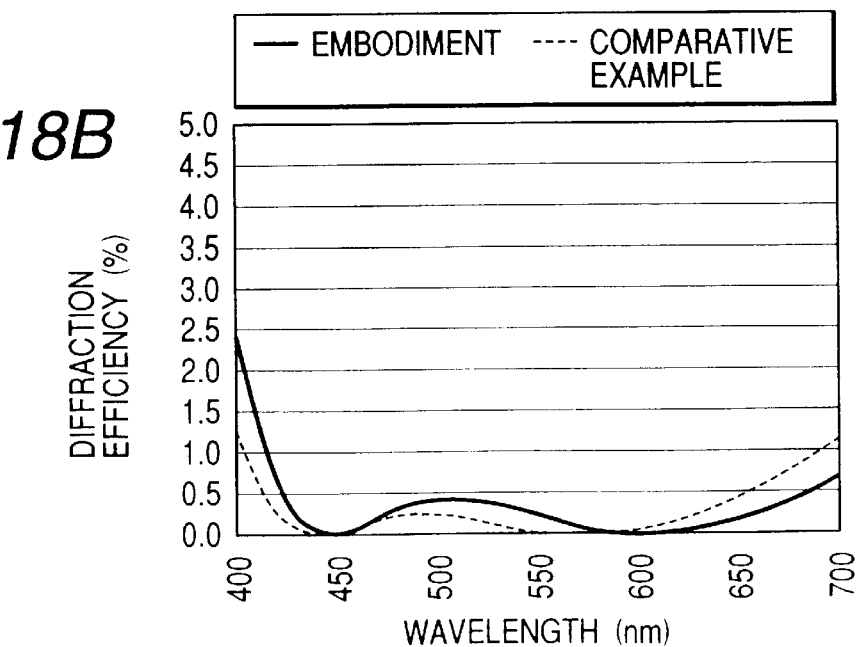

FIGS. 18A and 18B show the diffraction efficiencies of unnecessary-order diffracted light components. FIG. 18A shows the diffraction efficiencies of zero-order diffracted light components. FIG. 18B shows the diffraction efficiencies of second-order diffracted light components. As is obvious from FIGS. 18A and 18B, in contrast to the above case, the diffraction efficiency of blue flare is increased, and the diffraction efficiency of red flare is decreased.

FIG. 10 shows the relative light intensities in the respective areas in the flare state shown in FIG. 6C described above when the diffractive optical elements respectively having the two different diffraction efficiencies shown in FIG. 4 are used. In this case, as a numerical example that can be easily understood, the 8-bit CCD output form is exemplified.

Therefore, an output corresponding to the brightest area has level 255, and an output corresponding to the darkest has level 0. FIG. 10 shows the flare amounts in the respective areas in a case where a virtual CCD having the above spectral sensitivity is used to read an image. Outputs in the respective areas are shown when the evaluation order n is given by n=4, and an CCD output per unit area (one pixel) in areas a to c represented by U3,4(λ) becomes level 200. A value mathematically exceeding level 255 is regarded as a value saturated in the sensor and assumed to have level 255.

The numerical value of U1,n(λ) is U1,4(λ) in the area a; U1,4(λ)–U1,1(λ), in the areas b to d; and U1,4(λ)–U1,2(λ), in the areas e and f. Likewise, the numerical value of U2,n(λ) is U2,4(λ) in the areas a and b; U2,4(λ)–U2,1(λ), in the areas c to e; and U2,4(λ)–U2,2(λ), in the area f. The numerical value of U3,n(λ) is U3,4(λ) in the areas a to c; and U3,4(λ) –U3,1(λ) in the areas e and f.

In a table of FIG. 10, mark ○ means that the selected conditions satisfies the conditional expression but mark ×means that those does not satisfy the conditional expression. Further, areas in table with diagonal line means that the conditional expression is not applied to the selected condition. One of the conditional expressions (10) or (11) is applied to the conditions a–f. For example, regarding the condition a, the conditional expression (11) is applied but (10) is not applied, and thus an area corresponding to the conditional expression (10) is marked with diagonal line.

Further, one of the conditional expressions (12) or (13) is applied to the conditions a–f.

As is obvious from this table, the embodiment of the present invention satisfies conditional expressions (10), (11), (12), and (13) given above.

Although FIG. 2 shows the element having the diffraction grating portion formed on the flat plane in this embodiment, the same effects as described above can also be obtained from a diffractive optical element formed on the curved surface of a lens.

Figure 11:
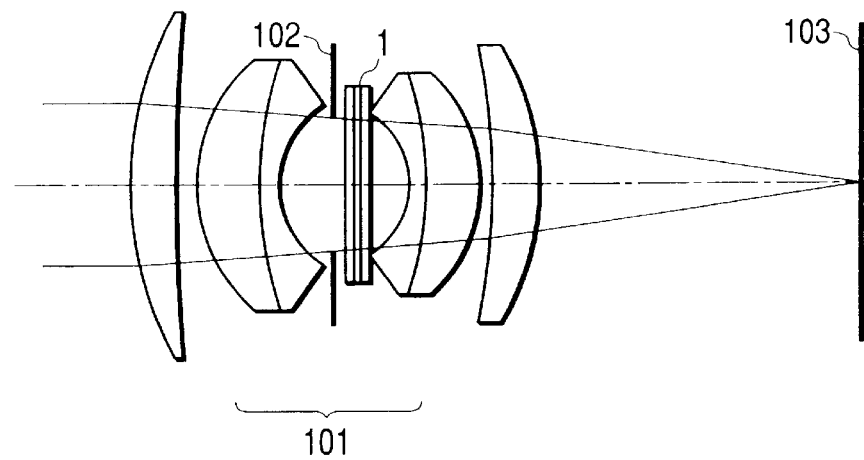
FIG. 11 is a schematic view of a picture taking optical system to which the first embodiment of the present invention is applied.

FIG. 11 shows an optical system to which the first embodiment is applied. FIG. 11 is a sectional view of the picture taking optical system of a camera or the like. Referring to FIG. 11, a picture taking lens 101 incorporates a diaphragm 102 and diffractive optical element 1 according to the present invention. A film or CCD 103 serves as an imaging plane.

By using a multilayered structure and optimally combining design wavelengths, the wavelength dependence of diffraction efficiency is greatly improved, and the color appearances of flare components of unnecessary orders are improved, thereby providing a picture taking lens with little flare (low visibility) and high resolution in various picture taking states.

Although FIG. 11 shows the diffractive optical element of the present invention which is formed on the flat glass surface near the diaphragm, the present invention is not limited to this. The diffractive optical element may be formed on the curved surface of a lens, and a plurality of diffractive optical elements according to the present invention may be used in a picture taking lens.

Although this embodiment has exemplified the picture taking lens of a camera, the present invention is not limited to this. The same effects as described above can be obtained by applying the present invention to imaging optical system used in a wide wavelength range, such as the picture taking lens of a video camera, an image scanner as office equipment, and the reader lens of a digital copying machine.

(Second Embodiment)

The above embodiment has been described by taking as an example an element having a photosensitive member whose sensitivity is in the visible region. Some sensors such as CCDs have sensitivity in the ultraviolet or near-infrared region as well as the visible region. In such a case, when the color appearance of flare is determined under daylight, the color appearance greatly changes under an artificial light or the like. To reduce variations in color appearance depending on the types of light sources, a filter for cutting infrared or ultraviolet light is preferably mounted on a portion of an optical system.

(Third Embodiment)

According to the shape of the diffraction grating described above, the grating thickness is constant. However, the present invention is not limited to this. Incident light beams passing through the diffractive optical element exhibit various incident conditions at positions on the diffractive optical element. If, therefore, the grating thickness of the diffractive optical element is changed at the respective positions in consideration of the differences between the incident conditions, the visibility of color flare can be suppressed more effectively.

(Fourth Embodiment)

The color appearance of flare has been described above by exemplifying the light-receiving members having three different sensitivity bands (R, G, and B bands) as the spectral sensitivities of a sensor (light-receiving means). When, however, an image is to be read by light-receiving members having spectral sensitivities corresponding to yellow, magenta, and cyan which are complementary colors of red, green, and blue, the flare amounts obtained by the light-receiving members dot not satisfy the conditional expressions in the first embodiment. In such a case, the flare amounts of the respective colors may be determined to satisfy the conditions in the embodiment with respect to outputs converted into R, G, and B outputs instead of outputs from the light-receiving members.

When a sensor for three colors, i.e., R, G, and B is used as well, the flare amounts of the respective colors are preferably determined to satisfy the above conditional expressions with respect to final image data obtained by performing various image processing instead of directly using outputs from the sensor.

(Fifth Embodiment)

Figure 12:
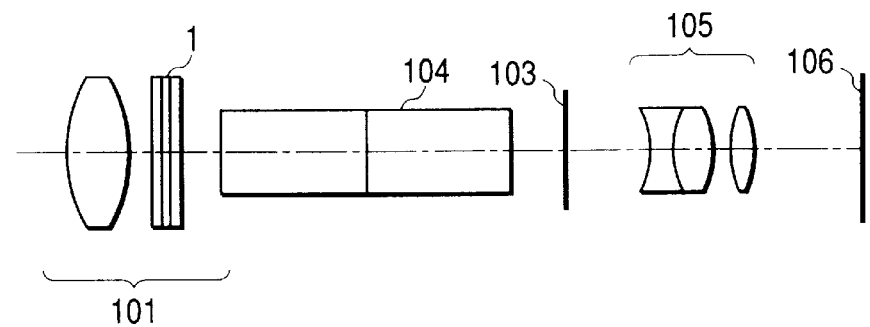
FIG. 12 is a schematic view of an observation optical system in the second embodiment of the present invention.

FIG. 12 shows the fifth embodiment of the present invention. FIG. 12 is a sectional view of an observation optical system such as a binocular. Referring to FIG. 12, this embodiment includes an objective lens 101, a prism (image inverting means) 104 for erecting an image, an eyepiece 105, and an evaluation plane (pupil plane) 106. A diffractive optical element 1 of the present invention is formed to correct chromatic aberration or the like at an imaging plane 103 of the objective lens 101.

By forming a diffractive optical element into a multilayered structure on the basis of a method of the present invention, the wavelength dependence of diffraction efficiency is greatly improved, and the color appearances of flare components of unnecessary orders are improved, thereby providing an objective lens exhibiting little flare (low visibility) upon a visual check and high resolution.

This embodiment has exemplified the case where the diffractive optical element 1 is formed on the objective lens 101. However, the present invention is not limited to this. The same effects as described above can also be obtained even if the diffractive optical element is formed on the surface of a prism or in the eyepiece. If, however, the diffractive optical element is disposed at a position closer to the object than the imaging plane, a chromatic aberration reducing effect can be obtained by the objective lens alone. Therefore, in a naked-eye observation system, the diffractive optical element is preferably disposed at least on the object lens side.

Although this embodiment has exemplified the binocular, the present invention is not limited to this. For example, the same effects as described above can also be obtained by applying the present invention to a terrestrial telescope or astronomical telescope or an optical finder for a lens shutter camera or video camera.

What is claimed is:

1. A picture taking apparatus having a diffractive optical element, which forms an image on photosensitive surface by using said diffractive optical element in an optical system, said diffractive optical element having a grating structure obtained by stacking a plurality of diffraction gratings made of at least two types of materials with different dispersion properties to enhance diffraction efficiency for a particular design order throughout a predetermined wavelength region and the grating structure is designed in such a way that a maximum optical path length difference becomes an integer multiple of a predetermined wavelength, wherein said diffractive optical element having a design wavelength $\lambda 0$, as the predetermined wave length, satisfying conditions given below:

$$U1,n(\lambda 0)-U1,r(\lambda 0)>0.75[U3,n(\lambda 0)-U3,r-1(\lambda 0)]$$

$$U1,n(\lambda 0)-U1,r(\lambda 0)>U3,n(\lambda 0)-U3,r(\lambda 0)$$

$$U1,n(\lambda 0)-U1,r(\lambda 0)>0.5[U2,n(\lambda 0)-U2,r-1(\lambda 0)]$$

$$U1,n(\lambda 0)-U1,r(\lambda 0)-U2,n(\lambda 0)-U2,r(\lambda 0)$$

(arbitrary integer satisfying $0<r<n$)
$U1,n(\lambda 0)$, $U2,n(\lambda 0)$, and $U3,n(\lambda 0)$ being given by $$U1,n(\lambda 0) = \sum_{p=m-n}^{m+n} \int_{\lambda 1}^{\lambda 2} \{L(\lambda)T(\lambda)F1(\lambda)Dp(\lambda 0, \lambda)Sp(\lambda)\}d\lambda$$

$$U2,n(\lambda 0) = \sum_{p=m-n}^{m+n} \int_{\lambda 1}^{\lambda 2} \{L(\lambda)T(\lambda)F2(\lambda)Dp(\lambda 0, \lambda)Sp(\lambda)\}d\lambda$$

$$U3,n(\lambda 0) = \sum_{p=m-n}^{m+n} \int_{\lambda 1}^{\lambda 2} \{L(\lambda)T(\lambda)F3(\lambda)Dp(\lambda 0, \lambda)Sp(\lambda)\}d\lambda$$

and, $U1,r(\lambda 0)$, $U2,r(\lambda 0)$, and $U3,r(\lambda 0)$ being given by $$U1,r(\lambda 0) = \sum_{p=m-r}^{m+r} \int_{\lambda 1}^{\lambda 2} \{L(\lambda)T(\lambda)F1(\lambda)Dp(\lambda 0, \lambda)Sp(\lambda)\}d\lambda$$

$$U2,r(\lambda 0) = \sum_{p=m-r}^{m+r} \int_{\lambda 1}^{\lambda 2} \{L(\lambda)T(\lambda)F2(\lambda)Dp(\lambda 0, \lambda)Sp(\lambda)\}d\lambda$$

$$U3,r(\lambda 0) = \sum_{p=m-r}^{m+r} \int_{\lambda 1}^{\lambda 2} \{L(\lambda)T(\lambda)F3(\lambda)Dp(\lambda 0, \lambda)Sp(\lambda)\}d\lambda$$

for $$\int Dm(\lambda 0,\lambda)L(\lambda)T(\lambda)F1(\lambda)d\lambda = \int Dm(\lambda 0,\lambda)L(\lambda)T(\lambda)F2(\lambda)d\lambda = \int Dm(\lambda 0,\lambda)L(\lambda)T(\lambda)F3(\lambda)d\lambda$$

where $Dp(\lambda 0, \lambda)$: a diffraction efficiency of a wavelength $\lambda$ when a diffraction order of said diffractive optical element is represented by p and a design wavelength is represented by $\lambda 0$, $Dm(\lambda 0, \lambda)$: a diffraction efficiency of the wavelength $\lambda$ when the diffraction order of said diffractive optical element is represented by m and the design wavelength is represented by $\lambda 0$, m: a design order, n: an order ($n>0$) contributing to flare, $\Sigma$: an addition symbol; although $\Sigma$ in each equation states that values from $P=m-n$ to $P=m+n$ are added, $p=m$ is not included, an integration symbol, $\lambda 1$ and $\lambda 2$: a shortest wavelength and longest wavelength in a predetermined wavelength region, $Sp(\lambda)$: a contribution ratio at the wavelength $\lambda$ of p-order diffracted light in a specific area on a light-receiving surface (an imaging position of a design order), $L(\lambda)$: a spectral characteristic at the wavelength $\lambda$ of a light beam incident on said optical system, $T(\lambda)$: a transmittance of said optical system at the wavelength $\lambda$, and $F1(\lambda)$, $F2(\lambda)$, and $F3(\lambda)$: spectral sensitivity characteristics of photosensitive surface each serving to detect light in a given wavelength range; a wavelength at which the spectral sensitivity becomes highest increases in the order of $F1(\lambda)$, $F2(\lambda)$, and $F3(\lambda)$.

2. An apparatus according to claim 1, wherein said plurality of diffraction gratings stacked on each other include at least one diffraction grating whose direction of an increasing or decreasing of a grating thickness differs from that of remaining diffraction gratings.

3. An apparatus according to claim 1, wherein the predetermined wavelength region is a visible region.

4. An apparatus according to claim 1, wherein said diffraction gratings are stacked on a substrate, and when said stacked diffraction gratings are named as a first diffraction grating, a second diffraction grating, and an ith diffraction grating, starting from said diffraction grating close to the substrate, said first diffraction grating and the substrate are made of the same material.

5. An apparatus according to claim 1, wherein said optical system comprises an imaging optical system.

6. A diffractive optical element used in an optical system to form an image on photosensitive surface, said diffractive optical element having a grating structure obtained by stacking a plurality of diffraction gratings made of at least two types of materials with different dispersion properties to enhance diffraction efficiency for a particular design order throughout a predetermined wavelength region and the grating structure is designed in such a way that a maximum optical path length difference becomes an integer multiple of a predetermined wavelength, wherein said diffractive optical element having a design wavelength $\lambda 0$, as the predetermined wavelength, satisfying conditions given below:

$$U1,n(\lambda 0)-U1,r(\lambda 0)>0.75[U3,n(\lambda 0)-U3,r-1(\lambda 0)]$$

$$U1,n(\lambda 0)-U1,r(\lambda 0)>U3,n(\lambda 0)-U3,r(\lambda 0)$$

$$U1,n(\lambda 0)-U1,r(\lambda 0)>0.5[U2,n(\lambda 0)-U2,r-1(\lambda 0)]$$

$$U1,n(\lambda 0)-U1,r(\lambda 0) \geq U2,n(\lambda 0)-U2,r(\lambda 0)$$

(arbitrary integer satisfying $0<r<n$)
$U1,n(\lambda 0)$, $U2,n(\lambda 0)$, and $U3,n(\lambda 0)$ being given by $$U1,n(\lambda 0) = \sum_{p=m-n}^{m+n} \int_{\lambda 1}^{\lambda 2} \{L(\lambda)T(\lambda)F1(\lambda)Dp(\lambda 0, \lambda)Sp(\lambda)\}d\lambda$$

-continued $$U2,n(\lambda 0) = \sum_{p=m-n}^{m+n} \int_{\lambda 1}^{\lambda 2} \{L(\lambda)T(\lambda)F2(\lambda)Dp(\lambda 0,\lambda)Sp(\lambda)\}d\lambda$$

$$U3,n(\lambda 0) = \sum_{p=m-n}^{m+n} \int_{\lambda 1}^{\lambda 2} \{L(\lambda)T(\lambda)F3(\lambda)Dp(\lambda 0,\lambda)Sp(\lambda)\}d\lambda$$

and, U1,r($\lambda$0), U2,r($\lambda$0), and U3,r($\lambda$0) being given by $$U1,r(\lambda 0) = \sum_{p=m-r}^{m+r} \int_{\lambda 1}^{\lambda 2} \{L(\lambda)T(\lambda)F1(\lambda)Dp(\lambda 0,\lambda)Sp(\lambda)\}d\lambda$$

$$U2,r(\lambda 0) = \sum_{p=m-r}^{m+r} \int_{\lambda 1}^{\lambda 2} \{L(\lambda)T(\lambda)F2(\lambda)Dp(\lambda 0,\lambda)Sp(\lambda)\}d\lambda$$

$$U3,r(\lambda 0) = \sum_{p=m-r}^{m+r} \int_{\lambda 1}^{\lambda 2} \{L(\lambda)T(\lambda)F3(\lambda)Dp(\lambda 0,\lambda)Sp(\lambda)\}d\lambda$$

for $$\int Dm(\lambda 0,\lambda)L(\lambda)T(\lambda)F1(\lambda)d\lambda = \int Dm(\lambda 0,\lambda)L(\lambda)T(\lambda)F2(\lambda)d\lambda = \int Dm(\lambda 0,\lambda)L(\lambda)T(\lambda)F3(\lambda)d\lambda$$

where
- Dp($\lambda$0, $\lambda$): a diffraction efficiency of a wavelength $\lambda$ when a diffraction order of said diffractive optical element is represented by p and a design wavelength is represented by $\lambda$0,
- Dm($\lambda$0, $\lambda$): a diffraction efficiency of the wavelength $\lambda$ when the diffraction order of said diffractive optical element is represented by m and the design wavelength is represented by $\lambda$0,
- m: a design order,
- n: an order (n>0) contributing to flare,
- $\Sigma$: an addition symbol; although $\Sigma$ in each equation states that values from P=m−n to P=m+n are added, p=m is not included,
- : an integration symbol,
- $\lambda$1 and $\lambda$2: a shortest wavelength and longest wavelength in a predetermined wavelength region,
- Sp($\lambda$): a contribution ratio at the wavelength $\lambda$ of p-order diffracted light in a specific area on a light-receiving surface (an imaging position of a design order),
- L($\lambda$) a spectral characteristic at the wavelength of a light beam incident on said optical system,
- T($\lambda$) a transmittance of said optical system at the wavelength $\lambda$, and
- F1($\lambda$), F2($\lambda$), and F3($\lambda$): spectral sensitivity characteristics of photosensitive surface each serving to detect light in a given wavelength range; a wavelength at which the spectral sensitivity becomes highest increases in the order of F1($\lambda$), F2($\lambda$), and F3($\lambda$).

7. An element according to claim 6, wherein said plurality of diffraction gratings stacked on each other include at least one diffraction grating whose direction of an increasing or decreasing of a grating thickness differs from that of remaining diffraction gratings.

8. An element according to claim 6, wherein the predetermined wavelength region is a visible region.

9. An element according to claim 6, wherein said diffraction gratings are stacked on a substrate, and when said stacked diffraction gratings are named as a first diffraction grating, a second diffraction grating, and an ith diffraction grating, starting from said diffraction grating close to the substrate, said first diffraction grating and the substrate are made of the same material.

10. A diffractive optical element in which a maximized diffraction efficiency is obtained at a design order and design wavelength, said element comprising:
   a plurality of diffraction gratings including a first diffraction grating and a second diffraction grating, each of the first diffraction grating and the second diffraction grating is formed from respective corresponding material with different dispersion properties,
   wherein the designed wavelength is set such that, when the designed order is assumed to mth-order, a flare intensity of red component per unit area at a predetermined surface among sum of (m+1)th-order and (m−1)th-order diffracted lights is substantially equal to a flare intensity of blue component per unit area at the predetermined surface among sum of (m+2)th-order and (m−2)th-order diffracted lights.

11. An optical system forming an image on a predetermined surface, comprising:
   a diffractive optical element in which a maximized diffraction efficiency is obtained at a design order and design wavelength, said diffractive optical element including a plurality of diffraction gratings including a first diffraction grating and a second diffraction grating, each of the first diffraction grating and the second diffraction grating is formed from respective corresponding material with different dispersion properties,
   wherein the designed wavelength is set such that, when the designed order is assumed to mth-order, a flare intensity of red component per unit area at a predetermined surface among sum of (m+1)th-order and (m−1)th-order diffracted lights is substantially equal to a flare intensity of blue component per unit area at the predetermined surface among sum of (m+2)th-order and (m−2)th-order diffracted lights.

* * * * *

UNITED STATES PATENT AND TRADEMARK OFFICE
CERTIFICATE OF CORRECTION

PATENT NO. : 6,757,104 B2
DATED : June 29, 2004
INVENTOR(S) : Takehiko Nakai

It is certified that error appears in the above-identified patent and that said Letters Patent is hereby corrected as shown below:

Column 4,
Line 2, please delete "O<r<n" and insert therefore -- 0<r<n --.

Column 5,
Line 58, please delete "O<r<n" and insert therefore -- 0<r<n --.

Column 17,
Line 17, please delete "xmeans" and insert therefore -- x means --.

Column 19,
Line 28, please delete "$U1,n(\lambda 0)\text{-}U1,r(\lambda 0)\text{-}U2,n(\lambda 0)\text{-}U2,(\lambda 0)$" and insert therefore
-- $U1,n(\lambda 0)\text{-}U1,r(\lambda 0)\geq U2,n(\lambda 0)\text{-}U2,(\lambda 0)$ --.
Line 29, please delete "O<r<n" and insert therefore -- 0<r<n --.

Column 20,
Line 7, please insert -- $\int$: -- before the words "an integration symbol".

Column 21,
Line 40, please insert -- $\int$ -- before the words ": an integration symbol".

Signed and Sealed this

Twenty-fifth Day of October, 2005

JON W. DUDAS
*Director of the United States Patent and Trademark Office*